US006378934B1

United States Patent
(12) United States Patent
Palazzolo et al.

(10) Patent No.: US 6,378,934 B1
(45) Date of Patent: Apr. 30, 2002

(54) CROSS-GUARD DUCT AND STEERING COLUMN SUPPORT BRACKET

(75) Inventors: Jack S. Palazzolo, Dearborn; Davin J. Cauvin, Royal Oak; Joseph J. Davis, Jr., Ortonville; Jeffrey L. Soncrant, Sterling Heights, all of MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/608,569

(22) Filed: Jun. 30, 2000

(Under 37 CFR 1.47)

Related U.S. Application Data

(63) Continuation-in-part of application No. 09/265,745, filed on Mar. 9, 1999.

(51) Int. Cl.[7] .................................................. B60J 7/00
(52) U.S. Cl. .......................... 296/208; 296/70; 454/127
(58) Field of Search ..................... 296/208, 70; 454/69, 454/127

(56) References Cited

U.S. PATENT DOCUMENTS 3,817,552 A * 6/1974 Knight, IV et al. ......... 280/150
5,085,465 A * 2/1992 Hieahim ..................... 280/738
5,088,571 A * 2/1992 Burry et al. .................. 296/70
5,180,189 A * 1/1993 Moreno ....................... 296/70
5,273,310 A * 12/1993 Terai ........................... 296/70
5,311,960 A * 5/1994 Kukainis et al. .............. 296/70
5,312,133 A * 5/1994 Pietila et al. ............... 280/752
5,354,114 A * 10/1994 Kelman et al. ............. 296/208
5,556,153 A * 9/1996 Kelman et al. ............... 296/70
5,673,964 A * 10/1997 Roan et al. ................. 296/208
5,676,216 A * 10/1997 Palma et al. .................. 296/70
5,678,877 A * 10/1997 Nishijima et al. ............ 296/70
5,707,100 A * 1/1998 Suyama et al. ............... 296/70
5,762,395 A * 6/1998 Merrifield et al. .......... 296/208
5,997,078 A * 12/1999 Beck et al. ................. 296/208
6,073,987 A * 6/2000 Lindberg et al. .............. 296/70
6,159,200 A * 12/2000 Verdura et al. ................ 606/1
6,186,885 B1 * 2/2001 Ahn et al. .................. 454/121
6,234,569 B1 * 5/2001 Derleth et al. .............. 296/208
6,237,956 B1 * 5/2001 Haba et al. ................. 296/192
6,237,495 B1 * 8/2001 Haba et al. ................... 296/70

* cited by examiner

*Primary Examiner*—Ken Patel
(74) *Attorney, Agent, or Firm*—MacMillan, Sobanski & Todd, LLC

(57) ABSTRACT

A cross-guard duct for a motor vehicle comprising a first member and a second member joined together at sealing points to form at least two chambers. Each chamber is provided with at least one inlet and at least one outlet. The chamber inlet is adapted to align with an outlet of a HVAC case. The chamber outlet is adapted to be connected to a vent or register of the motor vehicle. A support member extends downward from one of the chambers. The support member is an integral part of one of the members. The support member is adapted to support the HVAC case. The support member is provided with at least one pocket for receiving an energy-absorbing bracket. The invention is also directed towards a steering column support bracket comprising a metal and plastic molded over the metal.

20 Claims, 8 Drawing Sheets

CROSS-GUARD DUCT AND STEERING COLUMN SUPPORT BRACKET

CROSS-REFERENCE TO RELATED APPLICATIONS

This application is a continuation-in-part of co-pending U.S. patent application No. Ser. 09/265,745, filed on Mar. 9, 1999.

BACKGROUND OF THE INVENTION

This invention relates in general to motor vehicles and in particular, to motor vehicle components. Most particularly, the invention relates to cross-car beams, ducts, and support brackets for motor vehicles.

A conventional motor vehicle has an engine compartment towards its forward end and a passenger compartment rearward of the engine compartment. A laterally extending partition, commonly referred to as a firewall, is disposed between the engine compartment and the passenger compartment. A plenum chamber extends laterally along an upper end of the firewall. A forward end of the plenum chamber is typically welded to the top of the firewall. Opposing lateral ends of the plenum chamber are attached to hinge pillars, often referred to as cowl sides, disposed along opposing sides of the motor vehicle towards a forward end of the passenger compartment.

A typical motor vehicle has a flange disposed towards a forward end of the plenum chamber. The flange is provided for supporting a windshield. Fenders attached to the cow sides extend forward of the cowl sides. Passenger compartment doors are pivotally attached to the cowl sides and extend rearward of the cowl sides. A hood is pivotally attached to the fenders and extends towards the forward end of the vehicle.

In conventional motor vehicles, a cross-car beam extends between the cowl sides. Opposing lateral ends of the cross-car beam are attached to the cowl sides. A conventional cross-car beam is a closed steel chamber that increases the structural integrity of the vehicle, offering resistance to impact sustained along the sides of the vehicle.

The cross-car beam provides support for various automobile components. Such components include a glove compartment, a radio and tape deck or CD player, various storage pockets, an ashtray, a cigarette lighter or power outlet, and a coin receptacle.

A steering column support bracket extends longitudinally between the plenum chamber and the cross-car beam. A conventional steering column support bracket is typically 3 mm thick. A forward portion of the steering column support bracket is attached to the plenum chamber and a rearward portion of the steering column support bracket is attached to the cross-car beam. The rearward portion further has attached thereto a steering column.

Extending rearward of the cross-car beam are laterally spaced energy-absorbing (E/A) brackets which function to slow the occupants down and assist the seat belts when the motor vehicle sustains an impact.

Disposed forwardly of the cross-car beam is a duct. The duct functions to supply air to the passenger compartment. The duct usually has a supply inlet towards a forward end of the duct and a plurality of laterally spaced outlets towards a rearward end of the duct. The inlet is connected to the outlet of a heating, ventilating, and air conditioning (HVAC) case. The outlets are connected to registers through which air is discharged into the vehicle. The registers are adjustable to allow passengers to control airflow from the duct.

A second duct may extend parallel to and towards an upper end of the air supply duct. This duct functions as a demister to supply air to the windshield and the windows of the passenger compartment door. The air may be supplied through upper and lateral ends of the demister duct to eliminate mist on the windshield and windows of the passenger compartment doors.

Conventional cross-car beams, E/A brackets and steering column support brackets are typically steel. Steel is an expensive resource that is costly to form. Moreover, it is relatively heavy. Ducts are formed from plastic. Plastic is cheaper than steel and less costly to form. However, plastics have traditionally lacked the structural integrity of steel. What is needed is a hybrid cross-car beam and duct that is formed of a plastic. Such a combination would be cheaper than a steel cross-car beam in combination with a plastic duct.

SUMMARY OF THE INVENTION

The present invention is directed towards a cross-guard duct for a motor vehicle. The cross-guard duct comprises a first member and a second member joined together at sealing points to form at least two chambers. Each chamber is provided with at least one inlet and at least one outlet. The chamber inlet is adapted to align with an outlet of a HVAC case. The chamber outlet is adapted to be connected to a vent or register of the motor vehicle. A support member extends downward from one of the chambers. The support member is an integral part of one of the members. The support member is adapted to support the HVAC case. The support member is provided with at least one pocket for receiving an energy-absorbing bracket. The invention is also directed towards a steering column support bracket comprising a metal and plastic molded over the metal.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
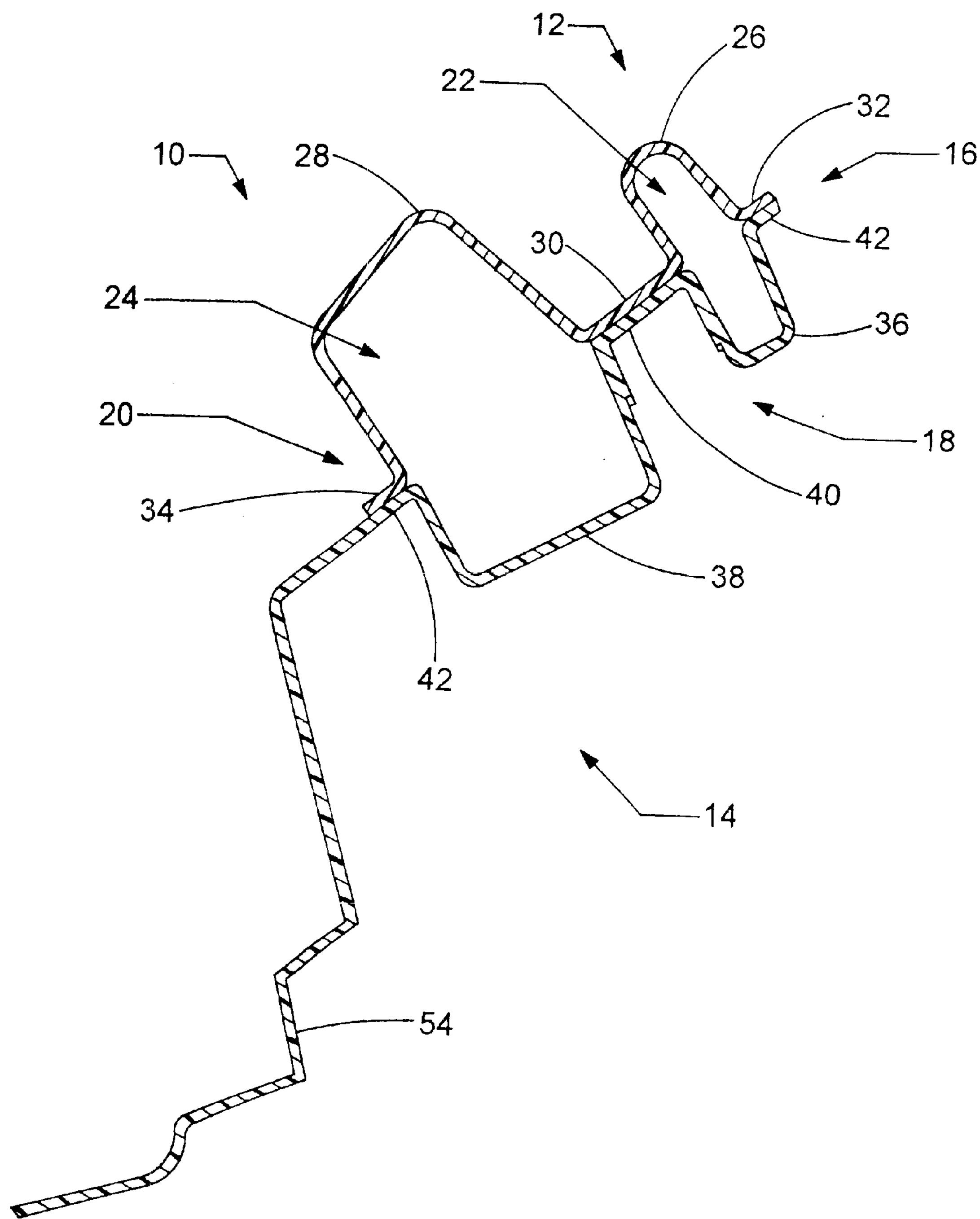
FIG. 1 is a sectional view in elevation of a cross-guard duct according to the invention.

Referring now to the drawings, there is illustrated in FIG. 1 a sectional view of a cross-guard duct 10 for a motor vehicle. The cross-guard duct 10 functions as a hybrid cross-car beam and duct assembly. The cross-guard duct 10 is formed from two members 12, 14 joined together at sealing points 16, 18, 20.

In a preferred embodiment of the invention, the two members 12, 14 are sealed to form two chambers 22, 24. A first member 12 preferably comprises two separate laterally extending semi-cylindrical portions 26, 28. A laterally extending central or inner flange 30 is disposed between the semi-cylindrical portions 26, 28. The inner flange 30 is preferably formed integrally with the semi-cylindrical portions 26, 28 to join opposing inner edges of the semi-cylindrical portions 26, 28 together. Each semi-cylindrical portion 26, 28 has a free outer edge opposite its inner edge. Each outer edge supports a laterally extending outer flange 32, 34.

Similar to the first member 12, a second member 14 preferably comprises two separate laterally extending semi-cylindrical portions 36, 38. A laterally extending central or inner flange 40 is likewise disposed between these semi-cylindrical portions 36, 38. The inner flange 40 is preferably formed integrally with the semi-cylindrical portions 36, 38 to join opposing inner edges of the semi-cylindrical portions 36, 38 together. Like the first member 12 above, each semi-cylindrical portion 36, 38 of the second member 14 has a free outer edge opposite its inner edge. Each outer edge supports a laterally extending outer flange 42, 44.

The flanges form the sealing points 16, 18, 20 between the two members 12, 14. The flanges 30, 32, 34 of the first member 12 are arranged to align with the flanges 40, 42, 44 of the second member 14. The aligned flanges are preferably substantially planar and parallel to one another. The flanges are preferably sufficiently large enough to make good surface contact with one another.

The aligned flanges are joined together to form the two chambers 22, 24. The flanges may be joined together in any suitable fashion. In a preferred embodiment of the invention, the flanges are joined together by vibration welding. Upon welding the flanges together, a seal is produced.

Figure 2:
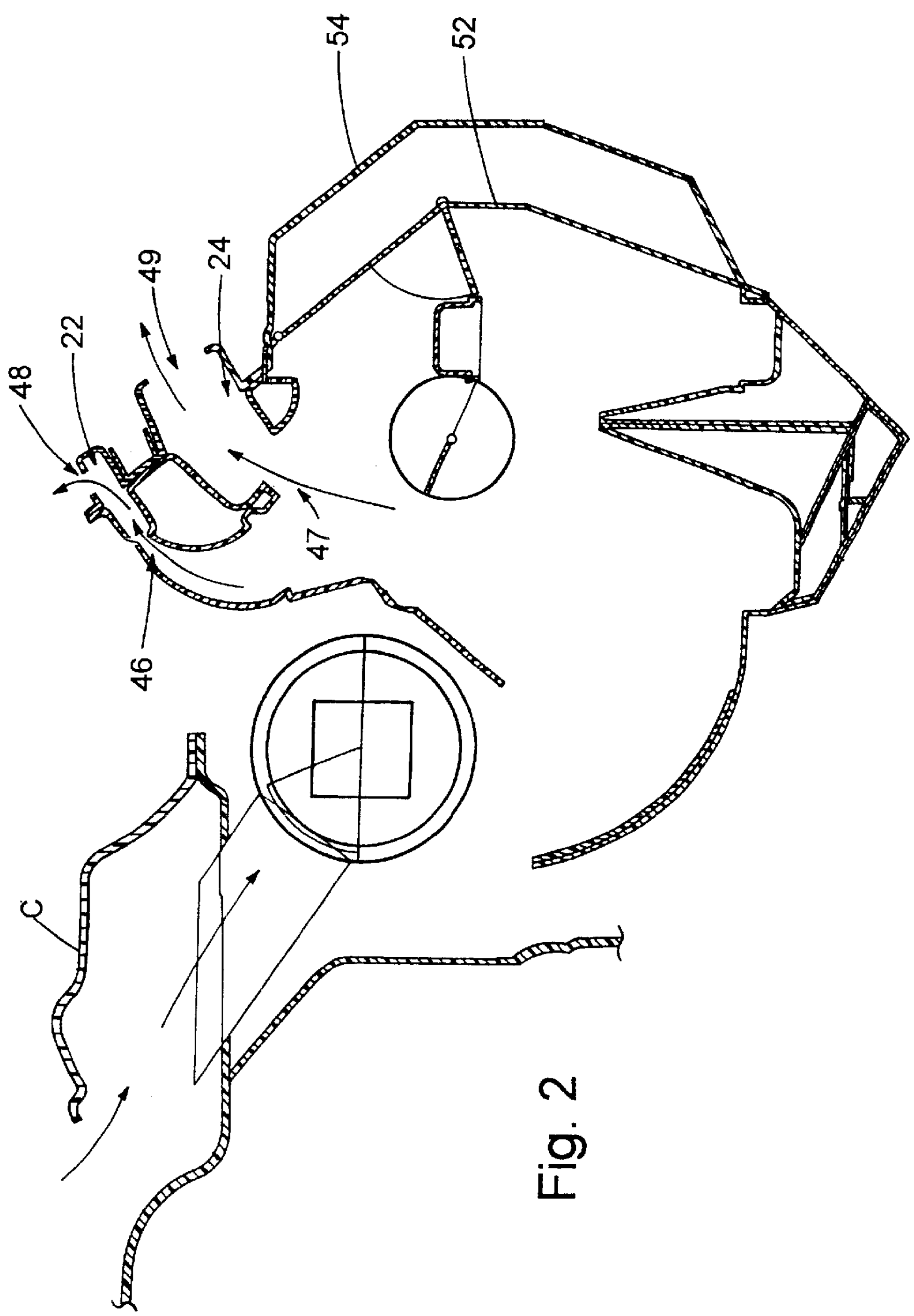
FIG. 2 is a reduced scale sectional-view in elevation of the, cross-guard duct shown in FIG. 1 supporting a HVAC case.

As shown in FIG. 2, each chamber 22, 24 is provided with at least one inlet 46, 47 and one or more outlets 48, 49. It is preferred that the chambers 22, 24 have a plurality of laterally spaced outlets. In addition, it is preferred that the lateral ends of one of the chambers 22 have outlets (not shown). The inlets 46, 47 are adapted to align with the outlet of a HVAC case 52. The outlets 48, 49 are adapted to be connected to vents or registers (not shown). One of the chambers 24 functions to supply air through the registers to the passenger compartment. The other chamber 22 functions as a demister to supply air through the vents or registers to the windshield and the windows of the passenger compartment doors. Air supplied to the passenger compartment may be heated or cooled as desired by the motor vehicle passengers. Air supplied to the windshield or windows facilitates in defrosting or demisting the windshield or windows. Air passing through the chambers 22, 24 may be controlled by the passengers by controlling the HVAC case 52 via environmental controls (not shown). The quantity and direction of air passing through the registers may be controlled by the passengers by adjusting the registers.

A support member 54 preferably extends downward from one of the chambers 24. The support member 54 is preferably an integral part of one of the two members 12, 14 forming the cross-guard duct 10. The support member 54 functions to support the HVAC case 52 as well as other components, such as a passenger airbag, a glove compartment, an ash tray, a cigarette lighter or power outlet, a radio, storage pockets, and a coin receptacle, to name a few. This list is not an inclusive list of components that may be supported by the support member 54 but rather is an illustrative list.

Figure 3:
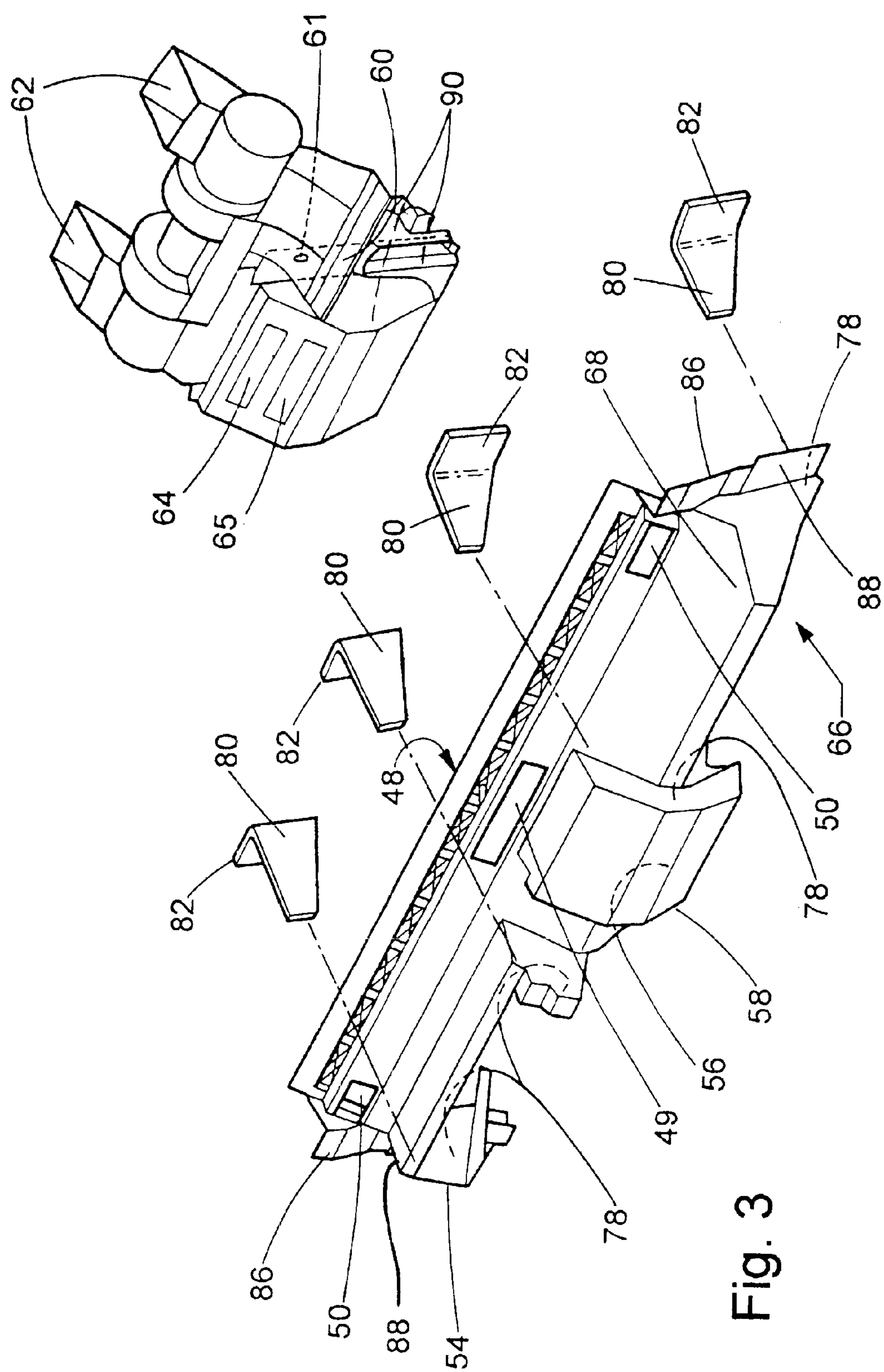
FIG. 3 is an exploded, reduced-scale rear perspective view of a second member of the cross-guard duct and the HVAC case shown in FIG. 2.
Figure 4:
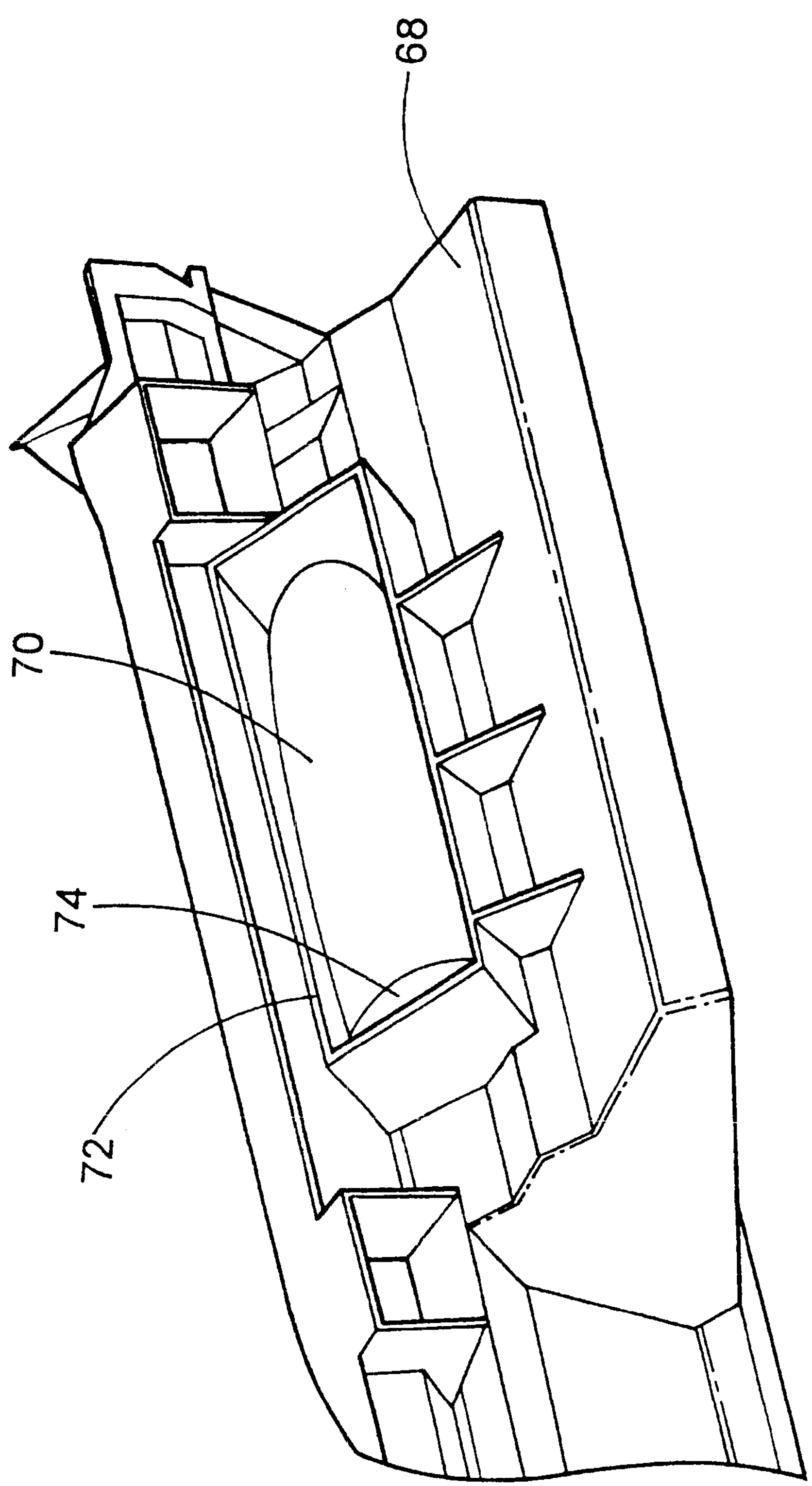
FIG. 4 is an enlarged, partial rear perspective view of the second member shown in FIG. 3 with an enclosure for receiving an airbag canister.

As is clearly shown in FIG. 3, the support member 54 may include a recess 56 for receiving the HVAC case 52. The recess 56 is preferably centrally located between lateral ends of the support member 54. The recess 56 may be defined by an enclosure 58 that projects rearward from the support member 54. The enclosure 58 has a forward exposed opening for receiving the HVAC case 52.

The HVAC case 52 is provided with laterally opposed flanges 60. The flanges 60 are provided with apertures 61 that are adapted to align with apertures (not shown) in the support member 54. The aligned apertures are adapted to receive fasteners (not shown) for securing the HVAC case 52 to the support member 54.

Any suitable HVAC case 52 may be received by the HVAC case enclosure 58. It is preferred that the HVAC case 52 be provided with two laterally spaced inlets 62. A centrally disposed blower motor may drive laterally opposed dual cage fans that draw air from outside of, or within, the motor vehicle. The air may be passed through the HVAC case 52 to heat or cool the air. The air is discharged from the HVAC case outlets 64, 65 into the chamber inlets 46, 47 (shown in FIG. 2). The air passes through the chambers 22, 24 and is discharged through the chamber outlets 48, 49, 51 and further through the vents or registers as desired by the passengers. Certainly, the HVAC case 52 may be provided with an outlet for discharging air into the passenger compartment without passing the air through the chambers 22, 24, such as by discharging air near the passengers' feet.

An opening 66 may be formed in the support member 54 to one side of the HVAC case enclosure 58. The opening 66 may be shaped and dimensioned to receive a glove compartment (not shown). The glove compartment is preferably insertable into the opening 66 so that it extends forward of the support member 54. The support member 54 is sufficiently structured to support a glove compartment door (not shown) adjacent the glove compartment. The glove compartment door may be fastened to the support member 54 in any suitable fashion.

The support member 54 may form a support surface or shelf 68 above the glove compartment opening 66. The shelf 68 may be adapted to support an airbag canister 70. In the preferred embodiment of the invention, the support member 54 forms an enclosure 72. This enclosure 72 defines a recess 74 for supporting the airbag canister 70. The enclosure 72 may be covered with a releasable panel (not shown) that encloses the airbag canister 70 in the enclosure 72. The panel may be released upon inflation of the airbag (not shown), which occurs in the event that the motor vehicle sustains an impact.

The support member 54 is preferably structured to provide support for components, such as the ash tray, cigarette lighter or power outlet, radio (none of which are shown), in a place within reach of the motor vehicle operator and passenger. A suitable location would be proximate the center of the support member 54, that is, between the lateral ends of the support member 54. Such components may be supported rearward of the HVAC case enclosure 58.

The support member 54 may form pockets or receptacles, or may define openings for receiving pockets or receptacles, in various locations. For example, an opening may be formed proximate the center of the support member 54 between the lateral ends for receiving an ashtray. A pocket may be formed or inserted in the same proximate location for storing sundry items. An opening may be provided in the same proximate location for supporting a cigarette lighter or power outlet. Of course, the motor vehicle would be provided with an interior panel, commonly referred to as a dash panel, which may be suitable for supporting various components exclusive of the support member 54.

In addition to the foregoing, the support member 54 may be provided with pockets 78 for receiving E/A brackets 80. The pockets 78 are preferably provided with forward exposed openings through with the E/A brackets 80 may be inserted. Pockets 78 are preferably formed towards the lateral ends of the support member 54 and adjacent opposing lateral ends of the HVAC case enclosure 58, thus providing four pockets 78 for supporting four separate E/A brackets 80. The support member 54 may be provided with apertures (not shown) that align with apertures in respective E/A brackets 80. The apertures are provided for receiving fasteners for securing the E/A brackets 80 within their respective pockets 78.

Figure 5:
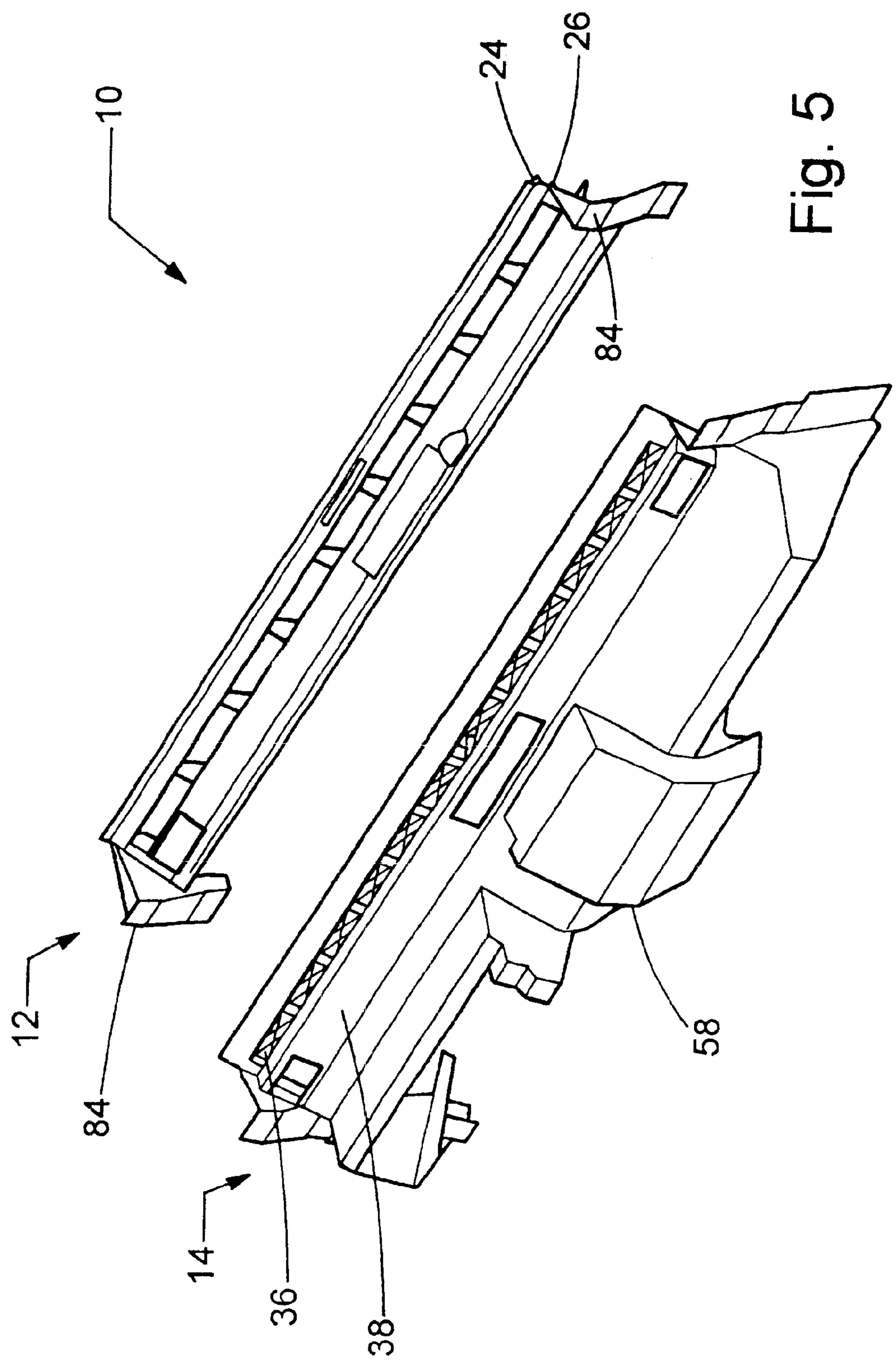
FIG. 5 is an exploded, reduced-scale rear perspective view of a cross-guard duct shown in FIG. 1.

The E/A brackets 80 towards the lateral ends of the support member 54 each preferably includes one or more flanges 82 that extend laterally outward. The lateral ends of the first and second members 12, 14 of the cross-guard duct 10 also include flanges 84 (shown in FIG. 5), 86, 88 that extend laterally outward. The E/A bracket flanges 82, 84 align with respective cross-duct member flanges 86, 88 of the first and second members 12, 14 of the cross-guard duct 10. The flanges 86, 88, 82, 84 are provided for securing the first and second members 12, 14 of the cross-guard duct 10 and the E/A brackets 80 to the opposing cowl sides of the motor vehicle. Apertures (not shown) may be provided in the flanges 82, 84, 86, 88 and in the cowl side for receiving fasteners (also not shown) for securing the cross-guard duct 10 and the E/A brackets 80 to the opposing cowl sides.

One of the central E/A brackets 80 is secured to the HVAC case 52 towards the passenger side of the passenger compartment. The other central E/A bracket 80 is secured to a brake pedal support bracket (not shown) located on the motor vehicle operator's side of the passenger compartment. This secures all four E/A brackets 80 in a substantially fixed position.

It should be noted that the flanges 82, 84, 86, 88 may support the cross-guard duct 10 in a desired orientation. For example, it may be desirable for the cross-guard duct 10 to be disposed at a particular angle, that is, to orient the demister chamber 22 forward relative to the air supply chamber 24, as shown.

Figure 6:
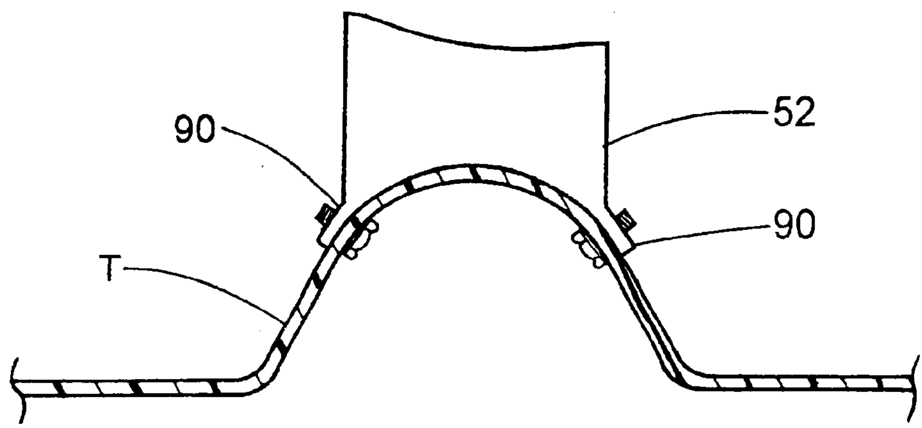
FIG. 6 is a diagrammatic representation in elevation of the HVAC case shown in FIGS. 2 and 3 secured to the tunnel of a motor vehicle.

To assist in supporting the cross-guard duct 10, the HVAC case 52, which is secured to the support member 54, may in turn be secured in a substantially fixed position relative to the motor vehicle. For example, motor vehicles are provided with a floor pan. A raised portion of the floor pan defines a tunnel for receiving the motor vehicle transmission and through which passes the motor vehicle drive shaft. Brackets 90 may be provided towards opposing lateral ends of the HVAC case 52. The brackets 90 may be provided with apertures (not shown) which align with apertures in the tunnel. The aligned apertures are adapted to receive fasteners for securing the HVAC case 52 to the tunnel T (shown in FIG. 6).

Figure 7:
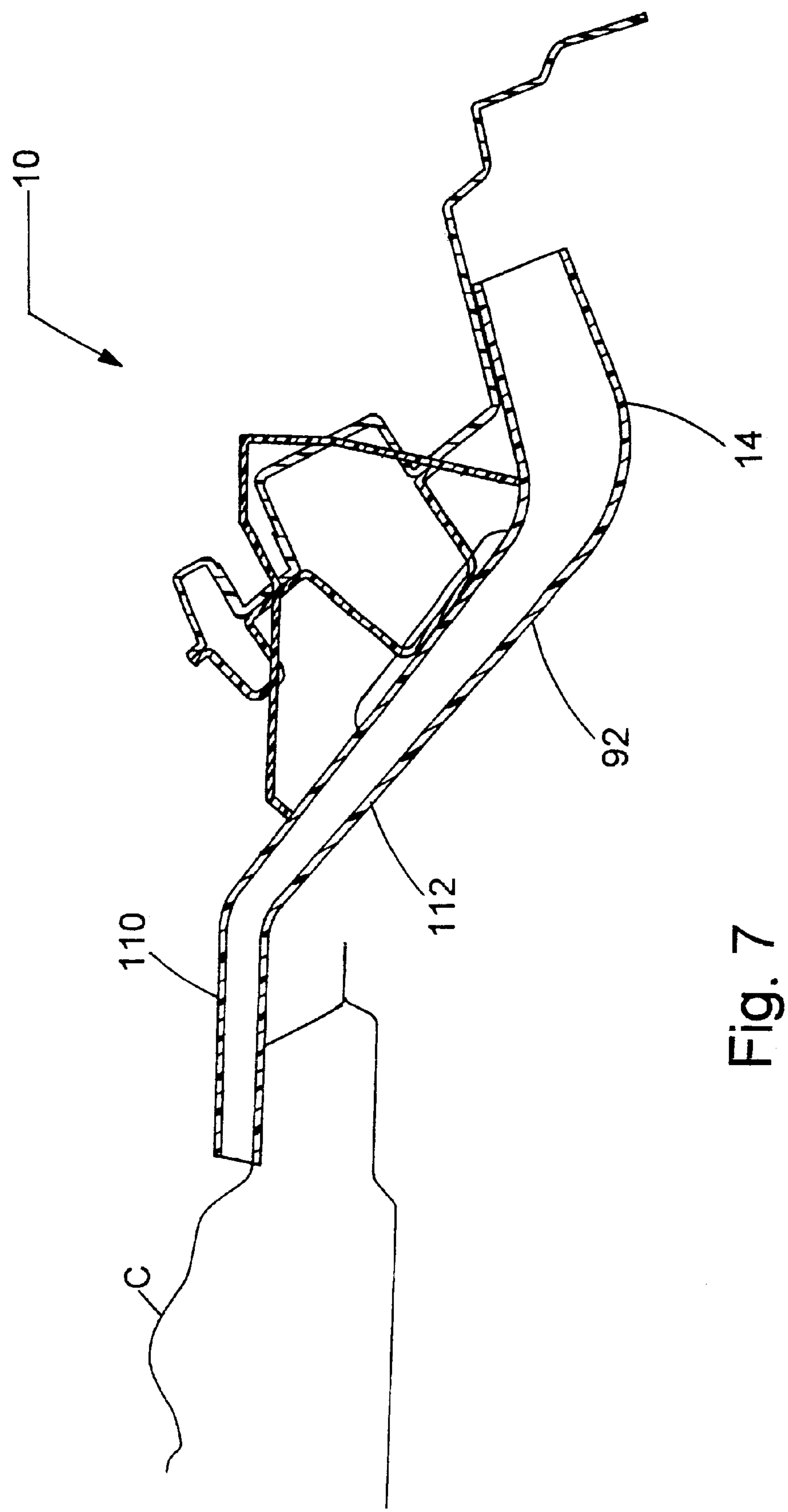
FIG. 7 is a reduced-scale sectional view in elevation of the cross-guard duct shown in FIG. 1 and a steering column support bracket connected between the motor vehicle plenum chamber and the cross-guard duct.
Figure 8:
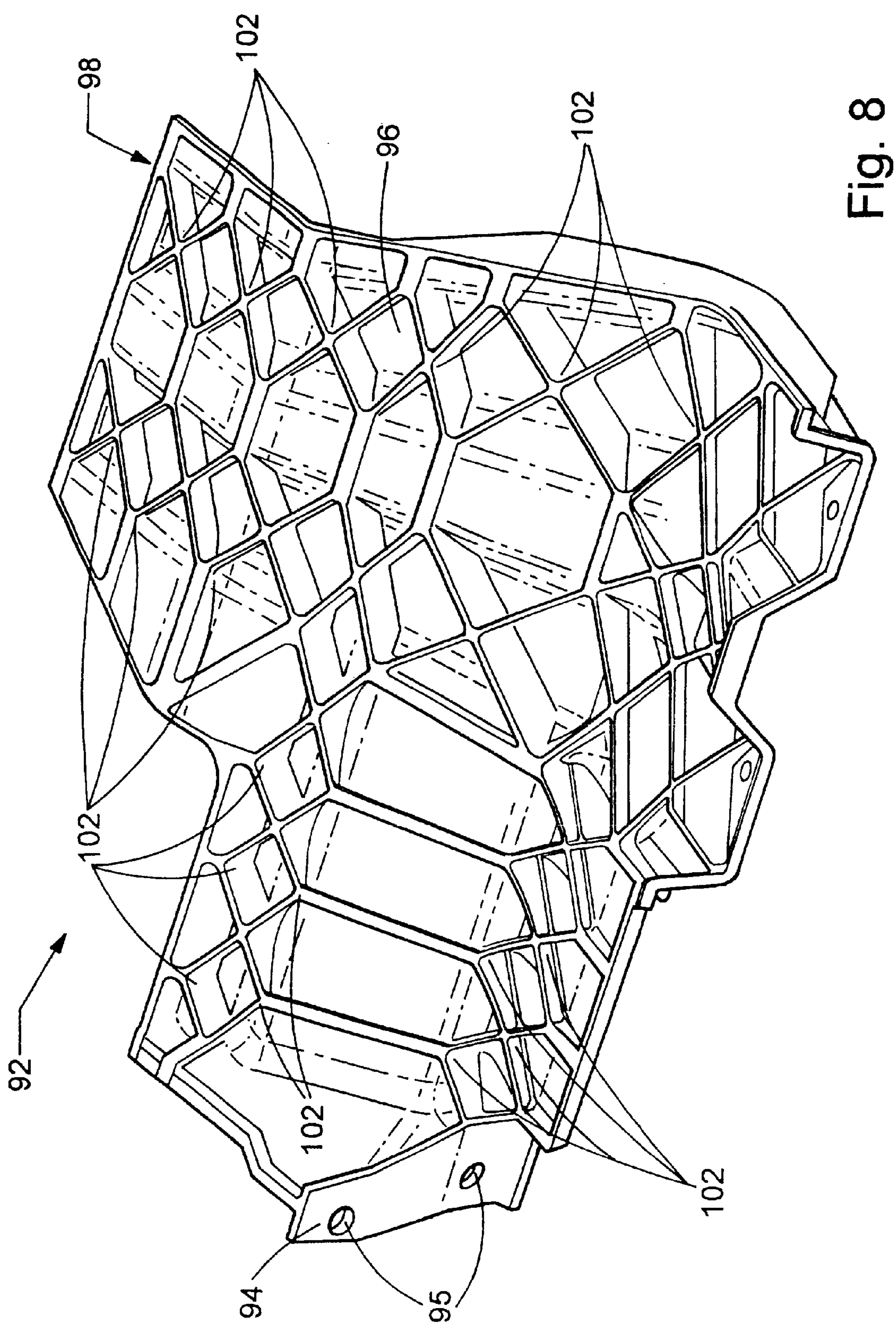
FIG. 8 is an enlarged top perspective view of the steering column support bracket shown in FIG. 7, as viewed from the rear.

The cross-guard duct 10 is adapted to be used in combination with a steering column support bracket 92. In addition to the support provided by the flanges 82, 84, 86, 88 and the HVAC case 52, the cross-guard duct 10 may be secured in a substantially fixed position relative to the plenum chamber or cowl top C (shown in FIG. 7) by the steering column support bracket 92. The steering column support bracket 92 is preferably located towards the motor vehicle operator's side of the passenger compartment, that is, between the HVAC case enclosure 58 and the cowl side on the operator's side of the passenger compartment. A lateral end of the steering column support bracket 92 may also be provided with a flange 94. This flange 94 may align with a respective cross-guard duct member flanges 86, 88 and a respective E/A bracket flange 82. The steering column support bracket 92 may be provided with apertures (shown in FIG. 8) that are adapted to align with the apertures in the cross guard duct member flanges 86, 88 and the E/A bracket flange 82. The apertures are adapted to receive fasteners (not shown) for securing the aligned flanges 94, 86, 88, 82 to a respective cowl side of the motor vehicle.

Figure 9:
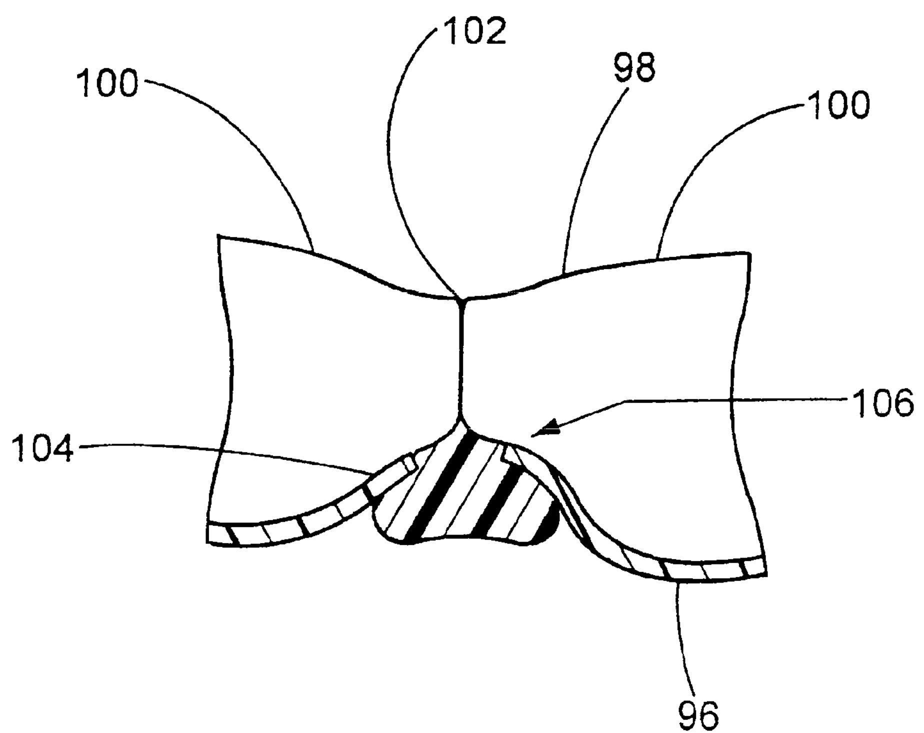
FIG. 9 is a diagrammatic representation of a section of the steering column support bracket shown in FIGS. 7 and 8 further showing a protrusion with a hole therein at the intersection of plastic ribs with plastic passing through and retained in the hole.

According to a preferred embodiment of the invention, the steering column support bracket 92 is formed from metal 96, such as a steel stamping, with resin or plastic 98 molded over or encapsulating the metal 96. The plastic 98 encapsulating the metal 96 is webbed or ribbed. The plastic ribs 100 intersect one another to form intersections 102. The metal 96 is preferably provided with a depression or protrusion 104 at each intersection 102. Each protrusion 104 (shown in FIG. 9) is preferably provided with a hole 106. When encapsulating the metal 96, the plastic 98 passes through the hole 106. When the plastic 98 cools, it is retained in the hole 106, holding the plastic 98 tightly in contact with the metal 96. In a preferred embodiment of the invention, only one side of the metal 96 is encapsulated with plastic 98. However, both sides of the metal 96 may be encapsulated with plastic 98, thus encapsulating the entire metal 96.

When only one side of the metal 96 is encapsulated, the plastic preferably wraps about the peripheral edges of the metal 96, as indicated at 108. This further insures that the plastic ribs 100 maintain contact with the metal 96. The retention of the plastic 98 in the holes 106 in the protrusions 104 and the plastic wrapped about the peripheral edges of the metal 96 holds the plastic ribs 100 in a substantially fixed position relative to the metal 96.

The metal 96 preferably has a Z-shaped construction defined by an upper forward leg 110, a central diagonally extending leg 112, and a lower rearward leg 114. The upper forward leg 110 is provided with apertures that are adapted to align with apertures in the cowl top. The aligned apertures are adapted to receive fasteners (also not shown) for fastening the steering column support bracket 92 to the cowl top. The central diagonally extending leg 112 is likewise provided with apertures. These apertures are adapted to align with apertures (not shown) in the support member 54 between the HVAC case enclosure 58 and the E/A bracket 80 on the motor vehicle, operator's side of the passenger compartment. These apertures are adapted to receive fasteners (also not shown) for fastening the steering column support bracket 92 to the support member 54. The lower rearward leg 114 is also provided with apertures. These apertures are adapted to align with apertures (not shown) in a lower end of the support member 54 and in a U-shaped steering column clamp. These apertures are adapted to receive fasteners (not shown) for fastening the U-shaped clamp, the steering column support bracket 92, and the support member 54 together.

It may be desirable to provide bosses (not shown) on the support member 54, the HVAC case 52, the steering column support bracket 92, or other components where components are secured together. This may insure that the components are tightly secured in a fixed position relative to one another.

It is preferred that the members 12, 14 of the cross-guard duct 10 be formed from injection molded plastic. It should be understood that more than two ducts may be formed. The various inlets and outlets may be provided in locations other than those locations shown. The members 12, 14 of the cross-guard duct 10 may be provided with ribs to improve the structural integrity of the cross-guard duct 10. Likewise, the steering column support bracket ribs 100 may be strategically located to increase its structural integrity, and thus, achieve optimal load distribution. It is most preferred that the plastic used be a high performance styrenic, such as glass filled engineering resin. Glass filled Dylark, by Nova Chemicals Corporation, in Calgary, Alberta, Canada, is a suitable plastic for use in carrying out the invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A cross-guard duct for a motor vehicle, said cross-guard duct comprising:

a first member and a second member joined together at sealing points to form at least two chambers, each said chamber being provided with at least one inlet and at least one outlet, said chamber inlet being adapted to align with an outlet of a HVAC case, said chamber outlet being adapted to be connected to a vent or register of the motor vehicle, and with said first and second members each comprises at least two separate laterally extending semi-cylindrical portions, a laterally extending flange disposed between said semi-cylindrical portions, and opposed laterally extending outer flanges, said sealing points being formed between said flanges of said first and second members; and a support member extending downward from one of said chambers, said support member being an integral part of one of said first member or said second member, said support member being adapted to support the HVAC case, said support member being provided with at least one pocket for receiving an energy-absorbing bracket.

2. The cross-guard duct according to claim 1, wherein said flanges are joined together by vibration welding.

3. The cross-guard duct according to claim 1, wherein said at least one outlet of each of said at least two chambers is a plurality of laterally spaced outlets provided on each of said chambers.

4. The cross-guard duct according to claim 1, wherein at least one of said chambers has lateral ends, said lateral ends having outlets.

5. The cross-guard duct according to claim 1, wherein said support member includes a recess defined by an enclosure projecting from said support member, said enclosure having an opening for receiving the HVAC case.

6. The cross-guard duct according to claim 1, wherein said support member has an opening shaped and dimensioned to receive a motor vehicle glove compartment.

7. The cross-guard duct according to claim 1, further including an enclosure formed by said support member, said enclosure supporting an airbag canister and being adapted to be covered by a releasable panel that encloses said airbag canister in said enclosure.

8. The cross-guard duct according to claim 1, wherein said at least one pocket provided with said support member is a plurality of pockets, with each adapted to receive one of a plurality of energy-absorbing brackets.

9. The cross-guard duct according to claim 1, wherein said first and second members each includes lateral ends, each said end having a flange extending laterally outward, said flanges being adapted to be secured to the motor vehicle cowl sides.

10. A cross-guard duct for a motor vehicle, said cross-guard duct comprising:

a first member and a second member joined together at sealing points to form at least two chambers, each said chamber being provided with at least one inlet and at least one outlet, said chamber inlet being adapted to align with an outlet of a HVAC case, said chamber outlet being adapted to be connected to a vent or register of the motor vehicle;

a support member extending downward from one of said chambers, said support member being an integral part of one of said first member or said second member, said support member being adapted to support the HVAC case, said support member being provided with at least one pocket for receiving an energy-absorbing bracket; and a steering column support bracket comprising a metal and plastic molded over said metal, said metal having a Z-shaped construction defined by an upper forward leg and a lower rearward leg, said upper forward leg being adapted to be secured to a cowl top of the motor vehicle and said lower rearward leg being adapted to be secured to said support member.

11. The cross-guard duct according to claim 10, wherein said plastic is ribbed, said ribs intersecting one another to form intersections, said metal being provided with protrusions at said intersections, each said protrusion being provided with a hole, said plastic at each said intersection passing through and being retained in a respective one of said holes.

12. The cross-guard duct according to claim 11, wherein said metal has a peripheral edge and said plastic wraps about said peripheral edge.

13. The cross-guard duct according to claim 10, wherein said first and second members each comprises at least two separate laterally extending semi-cylindrical portions, a laterally extending flange disposed between said semi-cylindrical portions, and opposed laterally extending outer flanges, said sealing points being formed between said flanges of said first and second members.

14. The cross-guard duct according to claim 10, wherein said at least one outlet of each of said at least two chambers is a plurality of laterally spaced outlets provided on each of said chambers.

15. The cross-guard duct according to claim 10, wherein at least one of said chambers has lateral ends, said lateral ends having outlets.

16. The cross-guard duct according to claim 10, wherein said support member includes a recess defined by an enclosure projecting from said support member, said enclosure having an opening for receiving the HVAC case.

17. The cross-guard duct according to claim 10, wherein said support member has an opening shaped and dimensioned to receive a motor vehicle glove compartment.

18. The cross-guard duct according to claim 10, further including an enclosure formed by said support member, said enclosure supporting an airbag canister and being adapted to be covered by a releasable panel that encloses said airbag canister in said enclosure.

19. The cross-guard duct according to claim 10, wherein said at least one pocket provided with said support member is a plurality of pockets, with each adapted to receive on of a plurality of energy-absorbing brackets.

20. The cross-guard duct according to claim 1, wherein said first and second members each includes lateral ends, each said end having a flange extending laterally outward, said flanges being adapted to be secured to the motor vehicle cowl sides.

* * * * *